United States Patent [19]

Lee

[11] Patent Number: 5,295,649

[45] Date of Patent: Mar. 22, 1994

[54] TELEPHONE SUPPORT FOR A ONE-PIECE TELEPHONE

[76] Inventor: Robert Lee, P.O. Box 54, Cazenovia, N.Y. 13035

[21] Appl. No.: 909,757

[22] Filed: Jul. 7, 1992

[51] Int. Cl.⁵ ............................................. H04M 1/06
[52] U.S. Cl. .................................. 248/205.2; 248/214; 248/309.1; 379/455
[58] Field of Search ................... 248/214, 205.2, 309.1; 379/454, 455, 446

[56] References Cited

U.S. PATENT DOCUMENTS

| | | | |
|---|---|---|---|
| D. 284,372 | 6/1986 | Carpenter | 379/455 X |
| 3,889,071 | 6/1975 | Davis et al. | 379/454 X |
| 4,351,505 | 9/1982 | Wickershaw | 211/89 X |
| 4,406,928 | 9/1983 | Mackenzie | 379/454 X |
| 4,432,522 | 2/1984 | Pruente et al. | 248/215 |
| 4,504,992 | 3/1985 | Herron et al. | 5/507 |
| 4,527,018 | 7/1985 | Offredi | D14/61 |
| 4,998,277 | 3/1991 | Rioux, Jr. | 379/454 |
| 5,169,105 | 12/1992 | Yasukawa | 248/205.2 |

*Primary Examiner*—Richard K. Seidel
*Assistant Examiner*—Kenneth E. Peterson
*Attorney, Agent, or Firm*—Parkhurst, Wendel & Rossi

[57] ABSTRACT

A braced telephone support for supporting a one-piece telephone from a bedrail assembly of a hospital bed. The support includes a planer vertical section for abutment against an interior surface of an upper horizontal bedrail, and a lip rearwardly extending from a top edge of the planer vertical section for hanging engagement with the upper horizontal bedrail. The support further includes a pair of retaining members forwardly extending from opposite sides of the planer vertical section, which members have inwardly bent ends. The retaining members and the planer vertical section define an area to receive and support a base of a one-piece telephone. The support also includes a longitudinal extension extending from the planer vertical section for abutment against an exterior surface of a lower horizontal bedrail. Since the planer vertical section and the longitudinal extension abut upper and lower bedrails of the bedrail assembly on opposite sides thereof, respectively, a bracing effect is established.

10 Claims, 2 Drawing Sheets

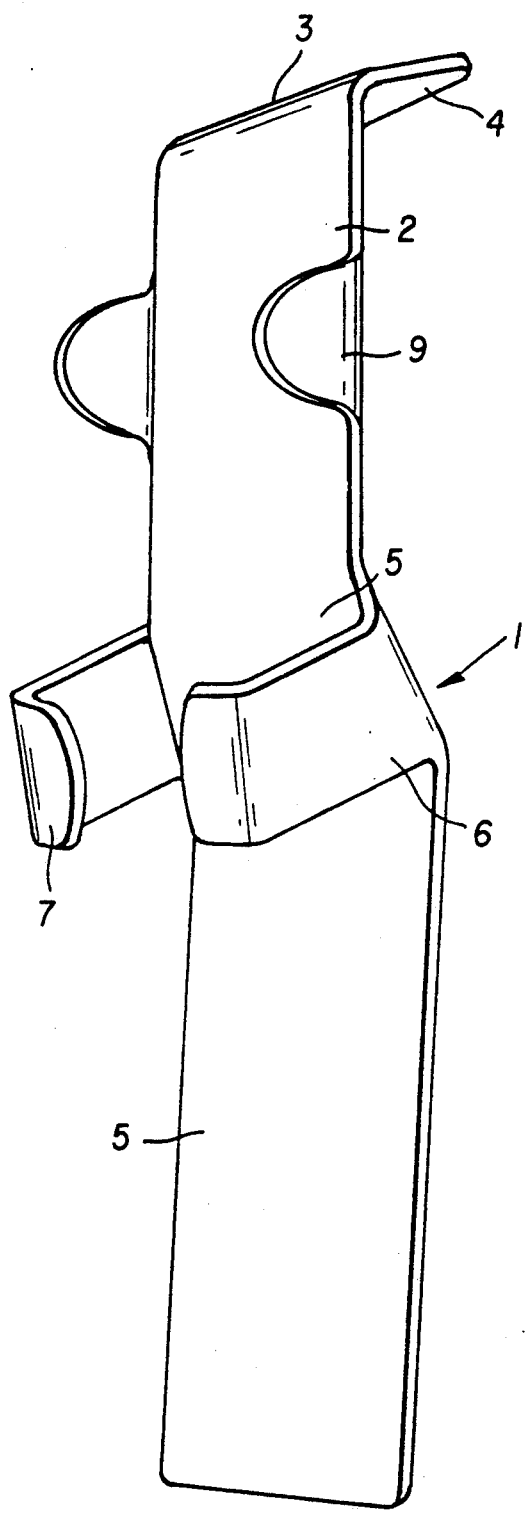
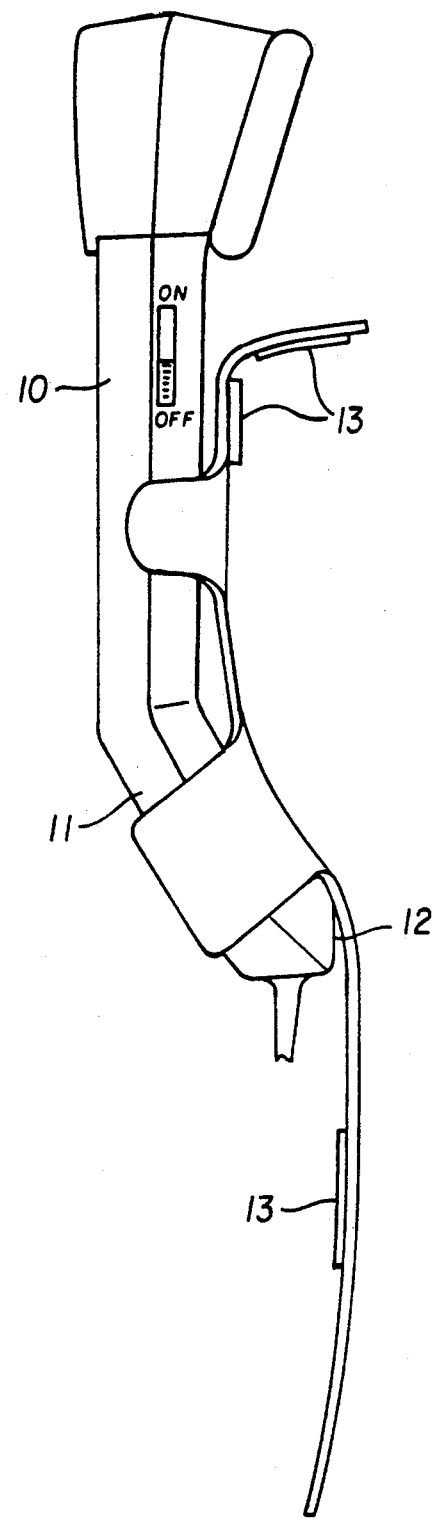
FIG. 1
FIG. 2

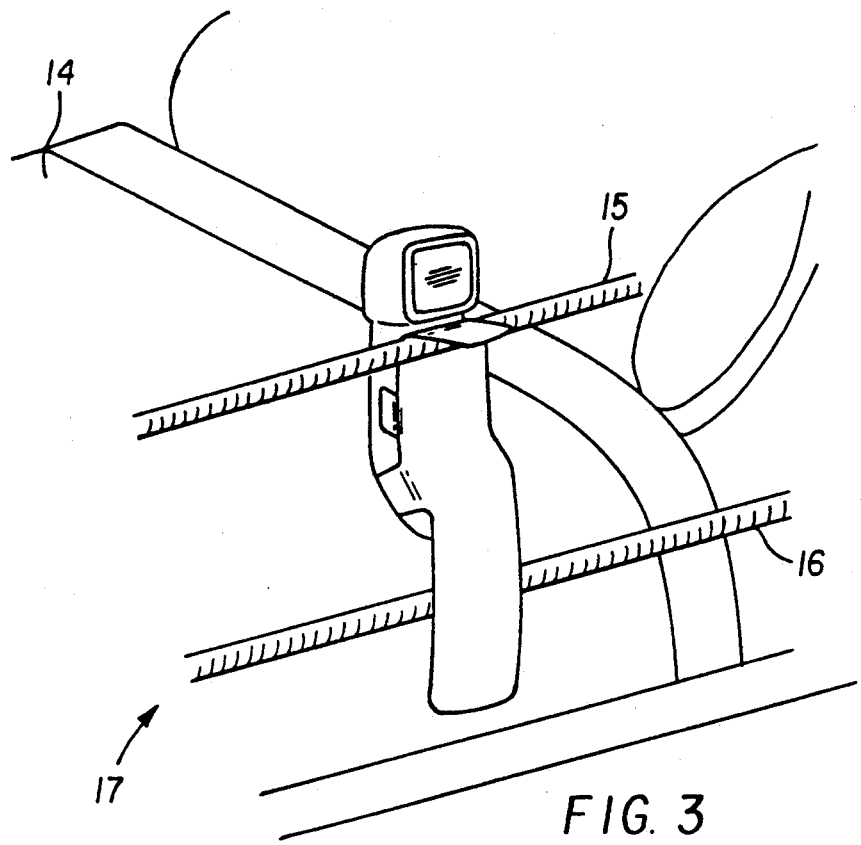
FIG. 3
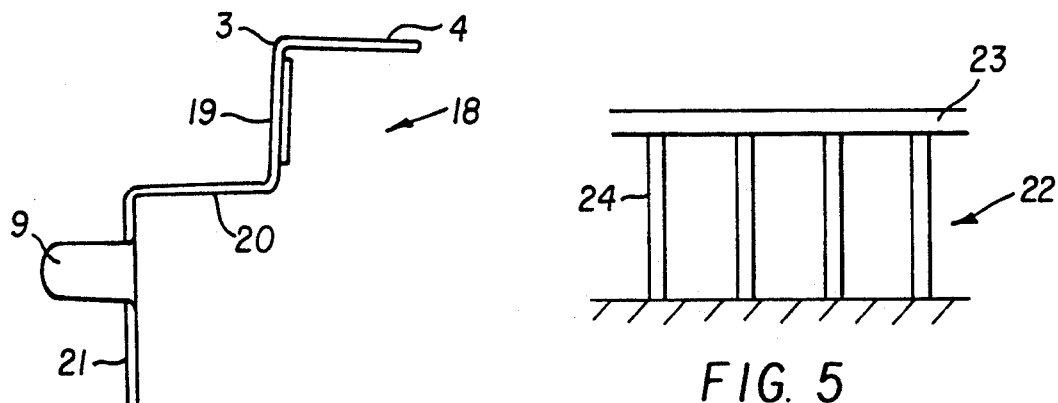
FIG. 4
FIG. 5
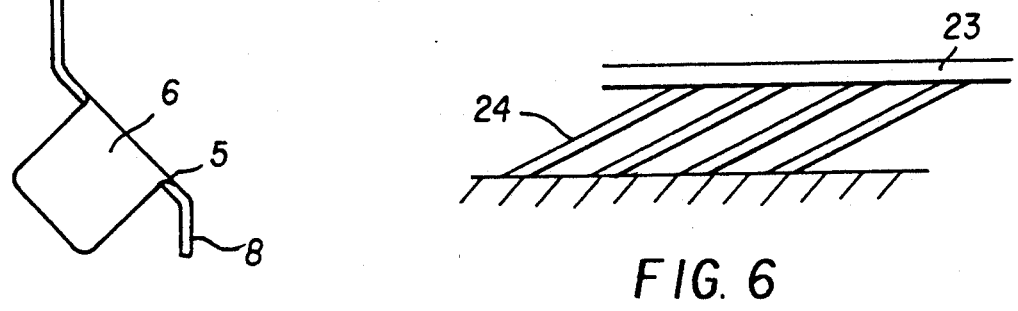
FIG. 6

TELEPHONE SUPPORT FOR A ONE-PIECE TELEPHONE

BACKGROUND OF THE INVENTION

1. Field of the Invention

The present invention generally relates to a device support for engagement with a bedrail assembly of a hospital bed. More particularly, the present invention is directed to an improved one-piece telephone support for such a bedrail assembly.

Recently, for the convenience and comfort of hospital patients, hospitals have provided bedside telephone service. Because of decreased mobility of a bedridden patient, access to a telephone must be convenient. Devices to provide this service should also be sanitary, and relatively easy and inexpensive to manufacture.

2. Description of the Prior Art

Prior art devices, such as that of U.S. Pat. No. 4,432,522 to Pruente et al., are directed to telephone supports for two-piece telephone systems. The disclosed device includes a bracket having a top hook for engagement with a top bedrail and an elongated base which has a rearwardly angled extension for abutting contact with a lower bedrail. However, this device is directed to a two-piece telephone system, inherently more complex. Further, the top hook of this device is angled inwardly thus restricting its removal during emergencies. A further drawback is that the angular extension renders the disclosed support incompatible with certain bed-rail structures. Because the angular extension of this device contacts the side of the bedrail adjacent the patient, without hooking engagement thereto, a patient may inadvertently bump into the support resulting in disengagement of the support from the bedrail assembly.

U.S. Pat. No. 4,998,277 to Rioux, Jr. discloses a support device for a one-piece telephone. This telephone includes a pair of c-shaped upper and lower clamps for hooking engagement to upper and lower horizontal rails of a bedrail assembly. This device includes an intermediate platform for supporting a linear-type one-piece telephone. Like the device of U.S. Pat. No. 4,432,522, this device is not universal, despite an embodiment disclosed therein having an adjustable length. Further, although this device overcomes, to some extent, problems with the above-described support of U.S. Pat. No. 4,432,522, relating to its instability, the presence of upper and lower hooks on this device inhibits its removal during medical emergencies.

SUMMARY OF THE INVENTION

Objects of the present invention include the creation of a convenient, creative, universal and sanitary telephone support for attachment to a bedrail assembly of a hospital bed. Other objects of the present invention include the provision of a telephone support which is easily manufactured at low cost.

Another object of the present invention is to provide a one-piece telephone support for a telephone having an angled base.

It is a particular object of the present invention to provide a telephone support which is braced, obviating the inadequate support of the prior art devices, while being easily removed from the hospital bed during medical emergencies.

According to one aspect of the present invention, a braced telephone support for supporting a one-piece telephone from a hospital bed rail assembly of a hospital bed, said bed rail assembly comprising upper and lower horizontal rails having interior surfaces facing said hospital bed, and exterior surfaces opposite the interior surfaces facing away from the hospital bed, comprises:

a planer vertical section for abutment against the interior surface of the upper horizontal rail;

a lip substantially perpendicularly and rearwardly extending from a top edge of the planer vertical section for hanging engagement along a top surface of the upper horizontal rail;

a pair of retaining members forwardly extending from opposite sides of the planer vertical section, the pair of retaining members having inwardly bent ends, the pair of retaining members and the planer vertical section defining an area for receiving and supporting the one-piece telephone; and a longitudinal extension extending from the planer vertical section for abutment against the exterior surface of the lower horizontal rail.

Another aspect of the present invention includes a telephone support for supporting, from a hospital bedrail assembly of a hospital bed, a one-piece telephone comprising an angular extension, said bedrail assembly comprising upper and lower horizontal rails having interior surfaces facing the hospital bed, and exterior surfaces, opposite the interior surfaces, facing away from the hospital bed, the telephone support comprising:

a planer vertical section for abutment against the interior surface of the upper horizontal rail;

a lip substantially perpendicularly and rearwardly extending from a top edge of the planer vertical section for hanging engagement along a top surface of the upper horizontal rail;

an angular section extending substantially downwardly and rearwardly from the planer vertical section;

a pair of retaining members forwardly extending from opposite sides of the angular section, the pair of retaining members having inwardly bent ends, the pair of retaining members and the angular section defining an area for receiving and supporting the angular extension of the one-piece telephone; and a longitudinal extension extending from the angular extension for abutment against the exterior surface of the lower horizontal rail.

Another aspect of the present invention includes a telephone support for supporting a one-piece telephone from an accordion-type bedrail assembly comprising a horizontal rail collapsably supported by a plurality of vertical rails, said horizontal rail having an interior surface facing said hospital bed and an exterior surface opposite said interior surface, facing away from said hospital bed, said one-piece telephone comprising an angular extension, said telephone support comprising:

a first planer vertical section for abutment against the exterior surface of the horizontal rail;

a lip substantially perpendicularly and rearwardly extending from a top edge of the first planer vertical section for hanging engagement along a top surface of the horizontal rail;

a displacement section forwardly extending from said first planer vertical section;

a second planer vertical section extending substantially downwardly from said displacement section;

an angular section extending substantially downwardly and rearwardly from said second planer vertical section; and a pair of retaining members forwardly extending from opposite sides of said angular section, said pair of retaining members having inwardly bent ends, said pair of retaining members and said angular section defining an area for receiving and supporting said angular extension of said one-piece telephone.

The telephone support of the present invention may advantageously include adhesive means for releasably securing the telephone support to the bedrail assembly. The adhesive means may be disposed along the longitudinal extension or the planer vertical section and the lip. Such means may comprise hook and latch fastening fabric (e.g., VELCRO TM) or magnetic tape, for example.

In a particularly preferred embodiment, the longitudinal extension may be angled forwardly toward a plane defined by the planer vertical section, thereby providing an additional bracing effect of the present telephone support.

As described above, one aspect of the present telephone support is designed such that the planer vertical section abuts one side of the telephone bedrail assembly, whereas the longitudinal extension abuts an opposite side of the bedrail assembly. These oppositely abutting portions provide a substantial bracing effect to prevent rotation of the support about the upper bedrail, without utilizing an upper and/or lower hook. As described above, such hooks inhibit quick detachment of the telephone support from the bedrail assembly.

A particular embodiment directed to a support for a one-piece telephone having an angled base is also provided. The above-described retaining members cooperate with the angular section of the telephone support to securely hold the telephone, obviating the need for an additional element (i.e., the resting base of the device of U.S. Pat. No. 4,998,277).

As described above, one aspect of the present invention makes use of two separate vertical planer sections. This particular embodiment is directed to a telephone support for use with an accordion-type bedrail assembly, wherein a top rail folds down upon its base via vertical rails which ar pivotally mounted to the base.

BRIEF DESCRIPTION OF THE DRAWINGS

The description herein makes references to the accompanying drawings, illustrative of the present invention and not limiting thereto, wherein:

FIG. 1 illustrates a perspective view of the present braced telephone support;

FIG. 2 is a side view of the telephone support supporting a one-piece angled telephone having an angled base;

FIG. 3 shows the present telephone support attached to a bedrail assembly of a hospital bed.

FIG. 4 is a side view of a second embodiment of the present telephone support.

FIG. 5 is a side view of an accordion-type bedrail assembly for use with the second embodiment of the present telephone support.

FIG. 6 is the accordion-type bedrail assembly of FIG. 5 as it is being collapsed.

DESCRIPTION OF THE PREFERRED EMBODIMENTS

Referring to the Figures, telephone support 1 is shown having a planer vertical section 2 terminating at a top edge 3. Extending from planer vertical section 2 at top edge 3, substantially perpendicularly, is lip 4. Angular section 5 extends downwardly and rearwardly from planer vertical section 2. Angular section 5 includes retaining members 6 having inwardly bent ends 7. Retaining member 6 and angular section 5 define an area which receives and supports angular extension 11 of one-piece telephone 10. Longitudinal extension 8 extends forwardly toward a plane defined by planer vertical section 2. This linear extension is particularly important for providing the above-described bracing effect of the telephone support. Further, the length of linear extension 8 can be made sufficiently long to adapt to several different types of bedrail assemblies regardless of the spacing between upper and lower horizontal bedrails.

In the particular embodiment shown in FIGS. 1 and 2, positioning members 9 forwardly extend from opposite sides of the planer vertical section 2. Magnetic tape 13 is disposed along planer vertical section 2, lip 4 and longitudinal extension 8.

As shown in FIG. 3, the telephone support 1 is mounted on upper and lower horizontal rails 15 and 16, respectively, of bedrail assembly 17 such that planer vertical section 2 abuts an interior surface (facing bed 14) of upper horizontal rail 15, and longitudinal extension 8 abuts an exterior surface (facing away from bed 14) of lower horizontal rail 16. These opposite abutting members cooperate to provide the above-described bracing effect, wherein an accidental force applied to a top portion of one-piece telephone 10 does not result in the overturning o disengagement of one-piece telephone 10 from telephone support 1, and further, does not result in the overturning or disengagement of the telephone support 1 from the bedrail assembly 17. As shown, these opposite abutting members obviate the need for hooks, as shown in prior art devices.

Further, the area between retaining members 6 having bent ends 7 and angular section 5 conveniently and simply receives angular extension 11 of telephone 10 in a secure manner. Advantageously, in the case of one-piece telephone 10 including a hang-up button disposed along end face 17, the telephone is hung-up by abutting contact thereof with longitudinal extension 8.

Referring to FIGS. 4–6, this second embodiment of the present invention includes telephone support 18 comprising a first vertical planer section 19 having lip 4 rearwardly and substantially perpendicularly extending from a top edge 3 thereof. Displacement section 20 connects first planer vertical section 19 to second planer vertical section 21. Angular section 5 extends substantially downwardly and forwardly from the bottom of the second planer vertical section 21, similar to that of the first embodiment. Longitudinal extension 8 of this embodiment is relatively short, in comparison with that of the braced telephone support shown in FIG. 1.

Telephone support 18 is intended for engagement with an exterior side of accordion-type bedrail assembly 22, in contrast with the interior engagement of the first embodiment. That is, engagement must be along an exterior side, since this accordion-type bedrail assembly 22 collapses, and telephone support 18 would contact the bed mattress of the hospital bed. The embodiment a shown in FIG. 4 advantageously overcomes limitations of prior art devices in that this device securely accommodates a one-piece telephone having an angled base, in addition to being universal for any accordion-type bedrail assembly. More specifically, since this device includes no hooking engagement, this support may be used with differently sized bedrail assemblies, while allowing its disconnection easily during an emergency.

Since the present telephone supports do not utilize an upper hook, thereby leaving lip 4 substantially planer, these supports may be hung along an edge of practically any horizontal surface. Therefore, this design allows a patient to use this support, along with the one-piece telephone, on a bedside table, for example.

The telephone support can be made of any suitable material. Preferably the material is plastic. Preferable forming methods include extrusion, injection molding, heat molding, or vacuum forming.

It can thus be seen that the present invention has provided a new and improved telephone support which is easy and economical to manufacture, while overcoming many of the disadvantages of the prior art devices.

It is understood that those skilled in the art of bed mounted devices may suitably alter the embodiments described herein without departing from the scope of the appended claims.

What is claimed is:

1. A braced telephone support for supporting, from a bedrail, a one-piece telephone comprising an angular extension, said telephone support comprising:
   a planar section;
   a lip extending along a first direction from a top edge of the planer section, said lip being substantially perpendicular to said planar section, wherein said planar section extends along a second direction away from and substantially perpendicular to said lip;
   an angular section extending section along a direction between said first and second directions;
   a pair of retaining members extending from opposite sides of said angular section, said pair of retaining members having inwardly bent ends, said pair of retaining members and said angular section defining an area for receiving and supporting said angular extension of said one-piece telephone;
   a pair of positioning members extending from opposite sides of said planer section along a third direction which is opposite said first direction; and
   a longitudinal extension extending from said angular extension.

2. The braced telephone support of claim 1, wherein said longitudinal extension is angled along said third direction toward a plane defined by said planer section.

3. The braced telephone support of claim 1, further comprising adhesive means disposed along at least one of said longitudinal extension, said planer section, and said lip.

4. The braced telephone support of claim 1, wherein said longitudinal extension has a length which permits securement of said telephone support to a hospital bedrail assembly regardless of the spacing between upper and lower horizontal rails of said assembly.

5. The braced telephone support of claim 3, wherein said adhesive means comprises at least one of hook and latch fastening fabric, and magnetic tape.

6. A telephone support for supporting a one-piece telephone from a bedrail assembly said one-piece telephone comprising an angular extension, said telephone support comprising:
   a first planer section;
   a lip extending along a first direction from a top edge of the first planer section, said lip being substantially perpendicular to said first planer section, wherein said first planer section extends along a second direction away from and substantially perpendicular to said lip;
   a displacement section extending from said first planer section along a third direction opposite said first direction;
   a second planer section extending from said displacement section along said second direction;
   an angular section extending obliquely from said second planer section along a direction between said first and second direction; and
   a pair of retaining members extending from opposite sides of said angular section, said pair of retaining members having inwardly bent ends, said pair of retaining members and said angular section defining an area for receiving and supporting said angular extension of said one-piece telephone.

7. The telephone support of claim 6, further comprising a pair of positioning members extending from opposite sides of said second planer section along said third direction.

8. The telephone support of claim 6, further comprising adhesive means disposed along at least one of said first planer section and said lip.

9. The telephone support of claim 8, wherein said adhesive means comprises at least one of hook and latch fastening fabric, and magnetic tape.

10. A telephone support for supporting a one-piece telephone from a bedrail assembly, said one-piece telephone including an angular extension, said telephone support comprising:
    a planer section;
    a lip extending along a first direction from a top edge of the planer section, said lip being substantially perpendicular to said planar section, wherein said planer section extends along a second direction away from and substantially perpendicular to said lip;
    an angular section extending obliquely from said planer section along a direction between said first and second directions;
    a pair of positioning members extending from opposite sides of said planer section along a third direction which is opposite said first direction; and
    a pair of retaining members extending from opposite sides of said angular section, said pair of retaining members having inwardly bent ends, said pair of retaining members and said angular section defining an area for receiving and supporting said angular extension of said one-piece telephone.

* * * * *